US008370282B1

(12) United States Patent
Leung et al.

(10) Patent No.: US 8,370,282 B1
(45) Date of Patent: Feb. 5, 2013

(54) IMAGE QUALITY MEASURES

(75) Inventors: Thomas Leung, Santa Clara, CA (US); Charles Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 823 days.

(21) Appl. No.: 12/507,276

(22) Filed: Jul. 22, 2009

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................................... 706/20
(58) Field of Classification Search ........................ None
See application file for complete search history.

(56) References Cited

U.S. PATENT DOCUMENTS 6,324,545 B1 * 11/2001 Morag .......................... 707/737
2005/0234904 A1 * 10/2005 Brill et al. .......................... 707/5

OTHER PUBLICATIONS

Aggarwal et al. "An Image Retrieval System With Automatic Query Modification", IEEE Transactions on Multimedia, vol. 4, No. 2, 2002, pp. 201-214.*

Ciocca et al. "A relevance feedback mechanism for content-based image retrieval", IFM, 35, 1999, pp. 605-632.*
Guo et al. "Learning Similarity Measure for Natural Image Retrieval With Relevance Feedback", IEEE transactions on neural networks, vol. 13, No. 4, 2002, pp. 811-820.*
Freund, et al. "A Short Introduction to Boosting" Journal of Japanese Society for Artificial Intelligence, Sep. 1999. pp. 771-780.
Grangier et al. "A Discriminative Kernal-based Model to Rank Images from Text Queries." Retrieved from internet http://uchicago.edu.

* cited by examiner

*Primary Examiner* — Jeffrey A Gaffin
*Assistant Examiner* — Li-Wu Chang
(74) *Attorney, Agent, or Firm* — Fish & Richardson P.C.

(57) ABSTRACT

An image quality subsystem computes quality scores for images that represent a measure of visual quality of the images. Initial quality scores and query specific quality scores can be computed for the images based on image feature values for the images and a transformation factor that represents a measure of importance of image quality for computing relevance scores for images. The initial quality scores are query independent quality scores that are computed for the images and can be used as a factor for computing relevance scores for the image relative to any query. Query specific quality scores are computed for images that are identified as relevant for a particular query based on the initial quality scores and a query specific transformation factor for the particular query. Adjusted relevance scores for the images can be computed based on the initial quality scores or the query specific quality scores.

26 Claims, 6 Drawing Sheets

IMAGE QUALITY MEASURES

BACKGROUND

The present disclosure relates to digital information processing, and particularly to computing image quality scores.

The Internet provides access to a wide variety of resources. For example, video files, audio files, and Web pages for content directed to particular subjects, book articles, or news articles can be accessed over the Internet. A search system can select one or more resources to be referenced by search results in response to receiving a user query that includes one or more search terms or phrases. The search system selects and scores resources based on their relevance to the query and their importance relative to other resources to provide search results that link to the selected resources. The search results are typically ordered according to the scores.

The relevance of resources to a user query can be determined based on the text associated with the resources. For example, text included in the content of the resources can be compared to the query to determine measures of relevance for the resources relative to the query. In turn, the resources are scored based on the measures of relevance and search results referencing the resources are ordered based on the scores.

Images are example resources that can be determined to be relevant to a query based on text associated with the image. The relevance of an image to the search query can be determined, for example, based on text that appears within a specified proximity of the image. For example, an image that is presented on a Web page and within a specified proximity of the text "football" can be determined to be relevant to the queries "football," and/or "sports" and referenced in search results for these queries.

While text associated with images can be used to compute measures of relevance of the images to a search query, the images that are determined to be relevant to the query based on the text can have varying levels of visual quality. For example, one image that is determined to be relevant to a query may be a high quality image (e.g., proper exposure, accurate color characteristics, and sharp), while another image determined to be relevant to the query may be a low quality image (e.g., under/over-exposed and/or blurry). User perception of the quality of search results can be affected by visual qualities of the images that are referenced by the search results.

SUMMARY

In general, one aspect of the subject matter described in this specification can be implemented in methods that include the actions obtaining, by a data processing device, initial quality scores for relevant images for a query, the relevant images being images previously selected to be referenced by search results for the query; selecting, by a data processing device, a transformation factor for the query for which the relevant images are identified as relevant, the transformation factor representing a measure of importance of image quality for computing relevance scores of relevant images; computing query specific quality scores for the relevant images based on a function of the transformation factor for the query and the initial quality scores for the images; and computing adjusted relevance scores for the relevant images based on the query specific quality scores and initial relevance scores for the relevant images. These and other implementations of this aspect include corresponding systems, apparatus, and computer products.

In another aspect of the subject matter described in this specification can be implemented in methods that include the actions selecting, by a data processing device, training images for training an image classification model, the training images comprising positive images and negative images, the positive images having relevance scores that meet or exceed a threshold relevance score for one or more queries, the negative images having relevance scores that are less than the threshold relevance score for one or more queries; identifying, by a data processing device, feature vectors for the training images, the feature vectors comprising feature values for the training images; training, by a data processing device, the image classification model to generate an initial quality score for images based on the feature vectors of the training images, the initial quality score being a query independent quality score; selecting, by a data processing device, a query independent transformation factor that represents a relative importance of image quality for computing relevance scores of images; computing, by a data processing device, initial scores for images based on feature vectors of the images and the image classification model; and computing, by a data processing device, adjusted relevance scores for the images based on the initial quality scores for the images, the transformation factor, and initial relevance scores for the images. These and other implementations of this aspect include corresponding systems, apparatus, and computer programs.

These and other implementations can optionally include one or more of the following features. The action training the image classification model can include the actions selecting training images for training an image classification model, the training images comprising positive images and negative images; identifying feature vectors for the training images, the feature vectors comprising feature values for the training images; and training the image classification model to generate an initial quality score based on the training images, the initial quality score being a query independent quality score. The action selecting the training images can include the action selecting positive images having relevance scores that meet or exceed a threshold relevance score for one or more queries and negative images having relevance scores that are less than the threshold relevance score for one or more queries. The action selecting the training images can include selecting positive images from a set of images that are referenced by a top threshold number of ordered search result presentation positions for one or more queries; and selecting negative images from a set of images that are referenced by a set of ordered search result presentation positions that are lower than the top threshold number of presentation positions for one or more queries. The method can further include the actions obtaining relevance feedback data for relevant images that have been selected in response to being referenced by search results for the query; and wherein the transformation factor is selected based on the relevance feedback data and initial quality scores for the relevant images.

Particular embodiments of the invention can be implemented to realize one or more of the following advantages. An image quality score can be generated for an image based on a feature vector for the image and an image classification model for determining whether an image is a high quality image or a low quality image. The image quality scores for images can be used to identify a resource quality score that represents a quality measure of a resource based on the quality of the images presented on the resource. A query specific quality score can be computed based on a transformation factor that represents a measure of importance of image quality for determining relevance of images to the query. The query specific quality score can be used to adjust relevance scores of relevant images for a query so that image quality is more determinative of a relevance score for images that are referenced in search results for a query for which high quality images are selected more frequently than low quality images.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An image quality subsystem ("quality subsystem") computes quality scores for images that represent a measure of visual quality ("quality measures") of the images. The quality scores for the images are computed based on image feature values for the images. For example, a quality score for an image having image feature values indicating that the image is blurry may be lower than an image having image feature values indicating that the image is not blurry. Initial quality scores ("initial scores") are query independent quality scores that are computed for the images and can be uniformly used as a factor for computing relevance scores for the image relative to queries. Query specific quality scores ("query scores") are computed for images that are identified as relevant for a query ("relevant images") based on the initial scores and a query specific transformation factor for the query.

The transformation factor represents a measure of importance of image quality for computing relevance scores for relevant images for a particular query. For example, a query requesting images of a celebrity may have a transformation factor that indicates that image quality is an important factor for users that provide the query, while a query for archived newspapers may have a transformation factor that indicates that image quality is not an important factor for users that provide the query. The transformation factor for a query can be determined based on performance metrics (e.g., user selections) of images that are referenced by search results for the query and corresponding initial scores for the images.

Images identified as relevant to a query can be selected to be referenced by search results based on the initial scores or the query scores for the images. For example, the initial scores or the query scores for the images can be used to adjust initial relevance scores of the images for the query and the images can be selected to be referenced based on the adjusted relevance scores. Similarly, the initial scores or the query scores for the images can be provided to a search system as a factor for computing relevance scores for the images and, in turn, selecting images to be referenced by search results for the query based on the relevance scores.

In some implementations, a quality subsystem can be implemented as an element of a search system in an online environment. In other implementations, the quality subsystem can be implemented in a processing device that communicates over a network with a search system to provide query scores or adjusted relevance scores. The description below describes the quality subsystem as being implemented as part of a search system.

Figure 1:
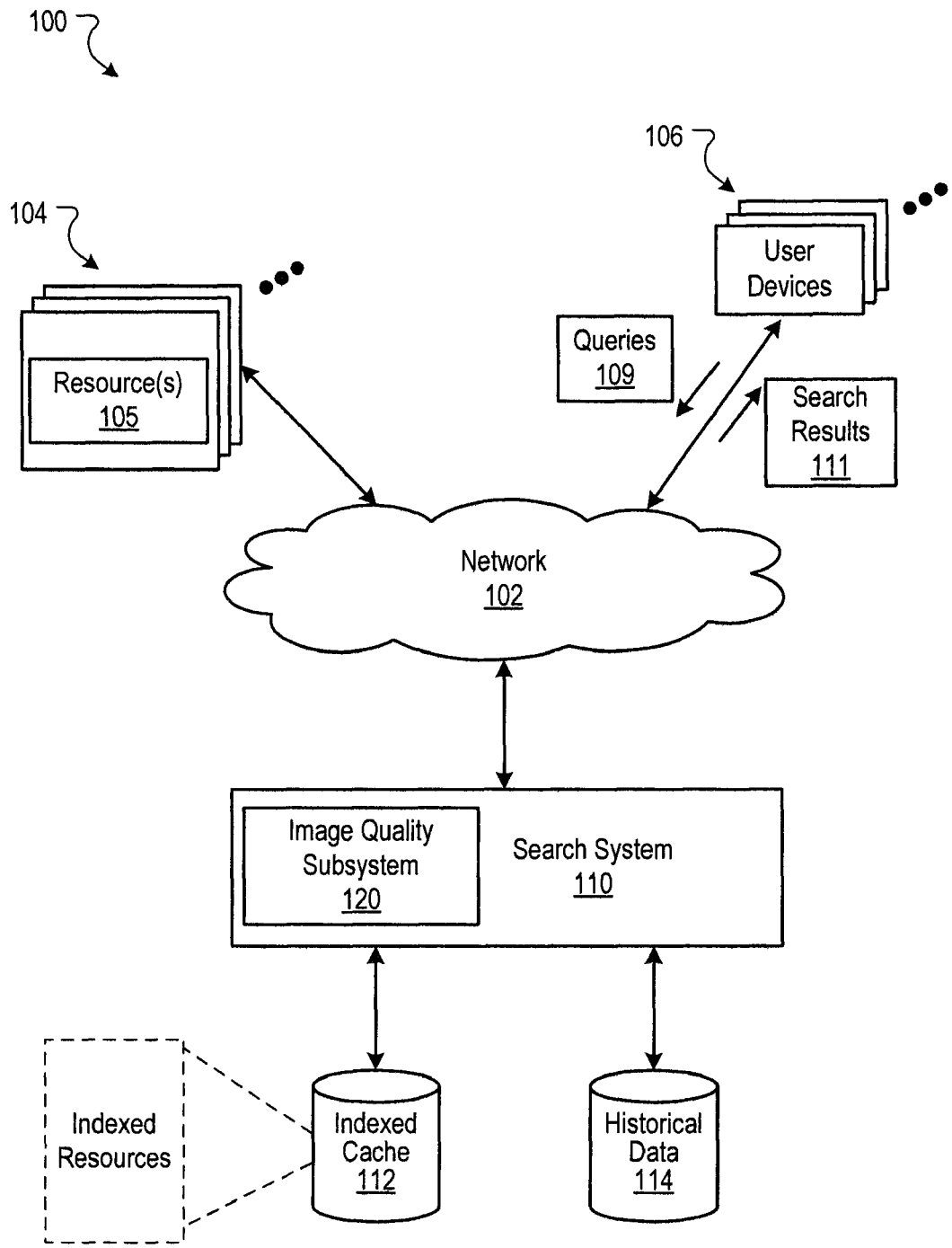
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects Websites 104, user devices 106, and the search system 110. The environment 100 may include many thousands of publishers 104 and user devices 106.

A Website 104 is one or more resources 105 associated with a domain name and hosted by one or more servers. An example Website is a collection of Web pages formatted in hypertext markup language (HTML) that can contain text, images, multimedia content, and programming elements, e.g., scripts. Each Website 104 is maintained by a publisher, e.g., an entity that manages and/or owns the Website.

A resource 105 is any data that can be provided by a Website 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on Websites 104. Data about the resources 105 can be indexed based on the resource to which the data corresponds. The indexed and, optionally, cached copies of the resources 105 are stored in an indexed cache 112.

The user devices 106 submit search queries 109 to the search system 110. In response, the search system 110 accesses the indexed cache 112 to identify resources 105 that are relevant to the search query 109. The search system 110 identifies the resources 105 generates search results 111 that identify the resources 105 and returns the search results 111 to the user devices 106. A search result 111 is data generated by the search system 110 that identifies a resource 105 that is responsive to a particular search query, and includes a link to the resource 105. An example search result 111 can include a Web page title, a snippet of text or a portion of an image extracted from the Web page, and the URL of the Web page.

For a search of textual content, the search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the user device 106 according to the order.

For a search directed to images that uses a text query as input, the search system 110 can combine the initial relevance score of a resource with a relevance feedback score of an image embedded in the resource. An example relevance feedback score is a score derived from a selection rate (e.g., click-through-rate) of an image when that image is referenced in a search result for a query. These combined scores are then used to present search results directed to the images embedded in the resources 105.

The initial relevance scores for an image can be based on labels that are associated with the image. Labels are textual content or data flags that indicate a topic to which the image belongs. Labels can be explicitly associated with an image, for example, by the publisher that is providing the image. For example, a publisher can associate the text "football" with an image that includes content that is directed to football (e.g., an image of a football or a football player). Labels can also be explicitly associated with an image by users to whom the image is presented. For example, users can engage in activities, such as online games, in which the users provide text that describes the content of an image that is presented to the user. In turn, when a threshold portion of users have specified particular text as being descriptive of the image, the image can be labeled with the particular text.

Labels can also be associated with an image based on the relevance feedback for the image. For example, a label matching a query can be associated with an image when the image is selected for presentation by users with at least a threshold selection rate. The threshold selection rate can be specified as a portion of the total search results for the query in which the image is referenced. In turn, the label can then be used to select the image for reference in search results responsive to future instances of the query.

The initial relevance score for an image to a query can also be based on how well an image label matches the query. For example, an image having a label that is the same as the query can have a higher relevance score to the query than an image having a label that is a root of the query or otherwise matches the query based on query expansion techniques (e.g., synonym identification or clustering techniques). Similarly, images having labels that match the query are identified as more relevant to the query than images that do not have labels matching the query. In turn, the images having labels that match the query may be selected for reference at higher search result positions in a search results page than images that do not match the query.

The user devices 106 receive the search results 111, e.g., in the form of one or more Web pages, and render the search results for presentation to users. In response to the user selecting a link in a search result at a user device 106, the user device 106 requests the resource 105 identified by the link. The Website 104 hosting the resource 105 receives the request for the resource from the user device 106 and provides the resource 105 to the requesting user device 106.

Search queries 109 submitted during user sessions are stored in a data store such as the historical data store 114. Selection data specifying actions taken in response to search results provided are also stored in a data store such as the historical data store 114. These actions can include whether a search result was selected. The data stored in the historical data store 114 can be used to map search queries 109 submitted during search sessions to resources 105 that were identified in search results 111 and the actions taken by users.

The search system 110 includes an image quality subsystem 120 to compute initial scores for images and query scores for the images. The image quality subsystem 120 can compute the initial scores for the images using an image classification model that accepts feature vectors for the images as inputs and provides an initial quality score as an output. The initial quality score can be used to compute or adjust relevance scores for the images relative to a query, compute query scores for the images relative to a query, or compute an aggregate quality score for a set of network resources, such as a Web page, Website, or domain. However, before the image classification models can be used, they must first be trained by the image quality subsystem 120.

Figure 2:
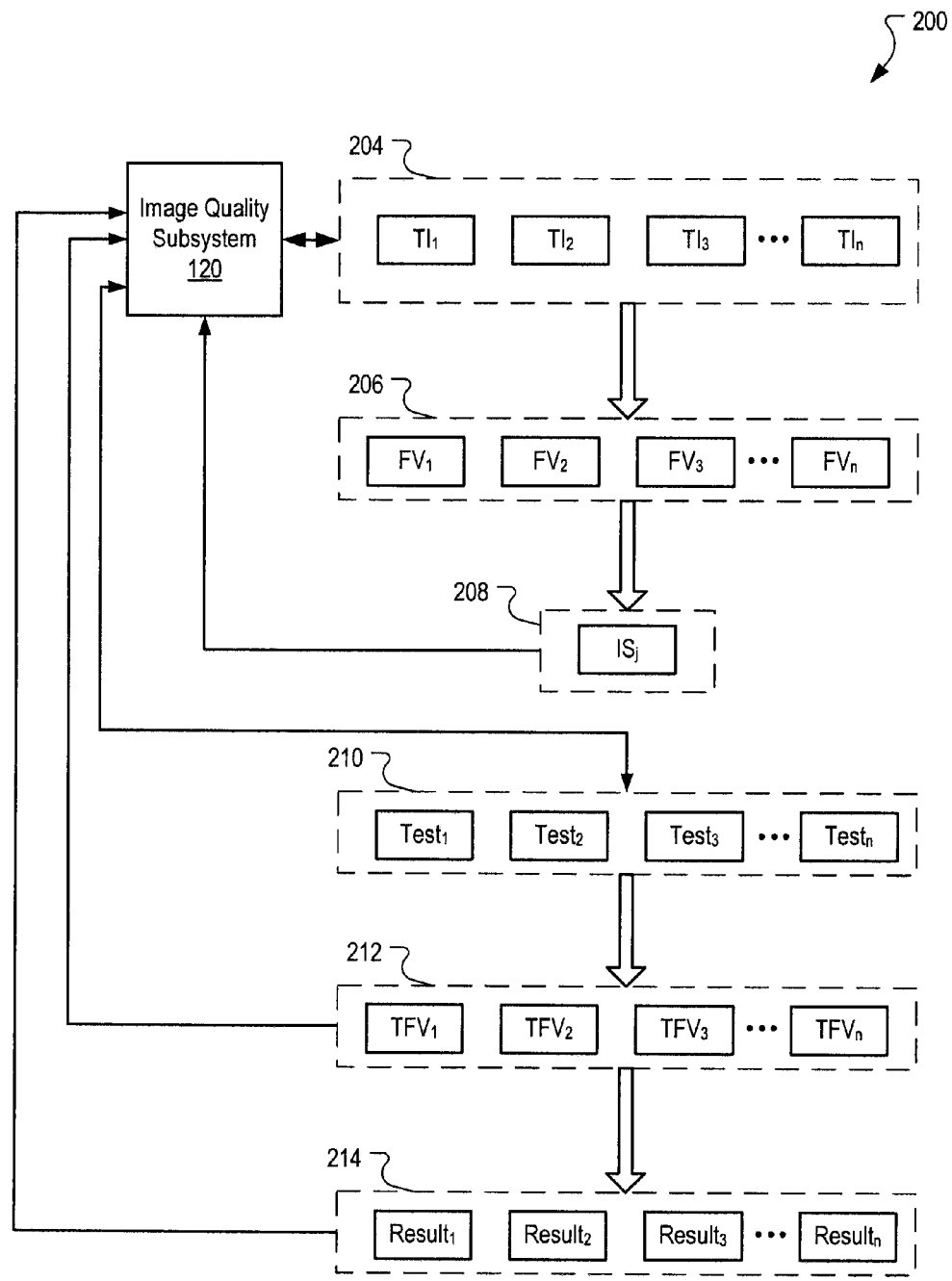
FIG. 2 is a block diagram of an example process flow for training an image classification model in an image quality subsystem.

FIG. 2 is a block diagram of an example process flow 200 for training an image classification model in an image quality subsystem 120. The image quality subsystem 120 selects relevant images for queries as training images $TI_1$-$TI_n$ for the model. For example, the image quality subsystem 120 can select images that the historical data store indicates were referenced in search results for queries as training images for the model. The training images $TI_1$-$TI_n$ are classified as "positive images" and "negative images" based on the relevance scores of the images for the query to which they are identified as relevant, both of which are used to train the model.

The positive images are images having relevance scores for the query that meet or exceed a threshold relevance score, while negative images are images having relevance scores that do not meet or exceed the threshold relevance score. The training images $TI_1$-$TI_n$ define a set of training images 204 that will be used to train the image classification model.

The image quality subsystem 120 obtains image feature values for each training image $TI_1$-$TI_n$. Image feature values are values that represent visual characteristics of images. For example, image feature values can specify a value representing a color, texture, and/or other characteristics of an image. The image quality subsystem 120 can compute the image feature values for the training images $TI_1$-$TI_n$ by analyzing the data defining the images, as described below in reference to FIG. 4. The image quality subsystem 120 can represent the image feature values of each of the training images $TI_1$-$TI_n$ as feature vectors $FV_1$-$FV_n$ that correspond to each of the training images $TI_1$-$TI_n$. The feature vectors $FV_1$-$FV_n$ define a set of feature vectors 206 that represent the set of training images 204.

The image quality subsystem 120 selects one of the feature vectors (e.g., $FV_1$) from the set of feature vectors 206. The feature vector can be semi-randomly selected from the set of feature vectors 206. The semi-random selection can be subject to a selection requirement specifying, for example, that a feature vector representing a negative image be selected with a threshold likelihood, as described in more detail below with reference to FIG. 4.

The image quality subsystem 120 classifies the training image corresponding to the selected feature vector using the selected feature vector as an input to the image classification model. The output of the image classification model is an initial score 208 for the image that represents a measure of the visual quality of the image. The manner in which the initial score is computed is described with reference to FIG. 4.

In some implementations, the initial score for the image is compared to a threshold quality score that indicates whether the image is classified as a positive ("high quality") image or a negative ("low quality") image. When the quality score meets or exceeds the threshold quality score, the image as classified as a positive image. When the quality score does not meet or exceed the threshold quality score, the image is classified as a negative image.

When the output of the image classification model accurately classifies a training image (e.g., correctly identifies a positive training image as such, or a negative training image as such), the image quality subsystem 120 selects another feature vector (e.g., $FV_2$) and classifies the corresponding training image (e.g., $TI_2$) using the image classification model.

When the output of the image classification model inaccurately classifies a training image (e.g., incorrectly identifies a negative image as a positive image or identifies a positive image as a negative image) the image classification model is adjusted based on the feature vector of the incorrectly classified training image, as described with reference to FIG. 4.

The image classification system 120 iteratively classifies training images based on the feature vectors to train the image classification model. When additional training images are incorrectly classified in subsequent iterations, the image classification model is further adjusted based on the feature vectors of the incorrectly classified training images. The image classification model is iteratively adjusted in response to misclassification of training images until a stop condition is satisfied. The stop condition can be, for example, a threshold number of training iterations having been completed.

Once the stop condition has been satisfied, the image quality subsystem 120 measures the accuracy of the image classification model using a set of test images 210. The set of test images 210 include positive images and negative images that were not included in the set of training images 204. The image quality subsystem 120 selects feature vectors for the set of test images 212 in a manner similar to which the feature vectors are selected for the set of training images 204. The feature vectors ($TFV_1$-$TFV_n$) for the test images define a set of test feature vectors 210. The image quality subsystem 120 iteratively selects a feature vector from the set of test feature vectors 212 and computes a result for the corresponding image based on the feature vector of the image and the image classification model. The results ($Result_1$-$Result_n$) from the image classification model define a set of results 214 that are indicative of whether the test images are high quality images or low quality images.

The image quality subsystem 120 uses the set of results 214 to calculate an error rate for the image classification model. The error rate is calculated, for example, based on a portion of test images that are incorrectly classified relative to a total number of images classified. When the error rate or the change in error rate from one or more previous iterations meets or exceeds a threshold error rate or threshold change in error rate, the image quality subsystem 120 continues the iterative training process with additional images from the set of training images 204. When the error rate or a change in the error rate is lower than the threshold error rate or a threshold change in error rate, the image classification model is defined as trained and the image quality subsystem 120 can use the image classification model to generate initial scores for images. The image quality subsystem classifies the images as high quality images or low quality images based on the initial quality scores. In turn, query scores for images can be computed based on the initial scores and transformation factors for the queries.

The image classification model is described throughout this document as being trained based on feature vectors of inaccurately classified training images. However, other training methods can be used, such as adjusting the image classification model to maximize a distance between the quality scores of a positive image and a negative image or training the image classification model based on the feature vectors for the training images in aggregate.

Figure 3:
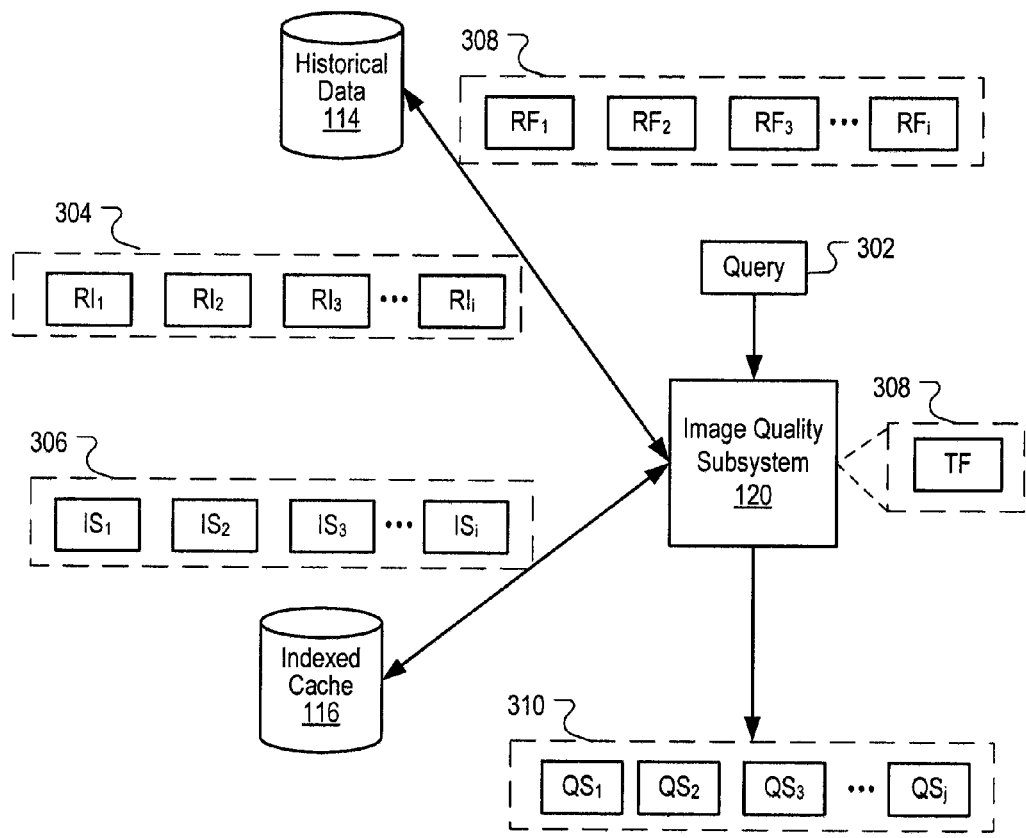
FIG. 3 is a block diagram of an example process flow for generating a query score for an image in the image quality subsystem.

FIG. 3 is a block diagram of an example process flow 300 for generating a query score for an image in the image quality subsystem 120. The image quality subsystem 120 obtains a query 302 as an input. The image quality subsystem 120 can obtain the query, for example, from a data store storing queries that were previously submitted by user devices, such as the historical data store 114. The image quality subsystem 120 identifies relevant images $RI_1$-$RI_i$ for the query. For example, the image quality subsystem 120 can select, as the relevant images $RI_1$-$RI_i$ that define a set of relevant images 304 for the query 302, images that the historical data store 114 indicates as being referenced in search results for the query.

The image quality subsystem 120 obtains data representing initial scores $IS_1$-$Is_n$ that define a set of initial scores 306 for the set of relevant images. The data representing the set of initial scores can be obtained, for example, from a data store that stores initial scores for images, such as the indexed cache 112. Alternatively, the initial scores can be computed using the image classification model, as described in more detail with reference to FIG. 4.

The image quality subsystem 120 selects relevance feedback data $RF_1$-$RF_i$ that define a set of relevance feedback data 308 for the set of relevant images 304. The set of relevance feedback data 308 represents measures of relevance of the set of relevant images 304 for the query 302. The set of relevance feedback data 308 is computed based on user actions in response to the set of relevant images 304 being referenced in search results for the query 302, as described in more detail with reference to FIG. 5.

The image quality subsystem 120 selects a transformation factor for the query based on the set of initial scores 306 and the set of relevance feedback data 308. The transformation factor represents a measure of user selections of relevant images relative to the initial scores 306 of the images. For example, the transformation factor can have a value between −2.0 and 2.0 representing a relative importance of image quality relative to user selections of images referenced in search results for the query. A single query independent transformation factor can be used for all queries or a query specific transformation factor can be selected for each query. Selection of the transformation factor is described in more detail with reference to FIG. 5.

The image quality subsystem 120 computes query scores $QS_1$-$QS_i$ for the set of relevant images 304 based on a function the transformation factor 308 for the query 302 and the set of initial scores 306. For example, a product of the transformation factor 308 and each of the initial scores $IS_1$-$IS_i$ can be specified as the query scores $QS_1$-$QS_i$ of the images for the query 302.

The query scores $QS_1$-$QS_i$ can be used to adjust relevance scores or to compute new relevance scores for the images relative to the query 302. For example, the query scores can be input to a function for generating relevance scores of images for a query or be used to adjust relevance scores provided by the search system based on a product of the query scores and the relevance scores. Computation of query scores is described in more detail with reference to FIG. 5.

Figure 4:
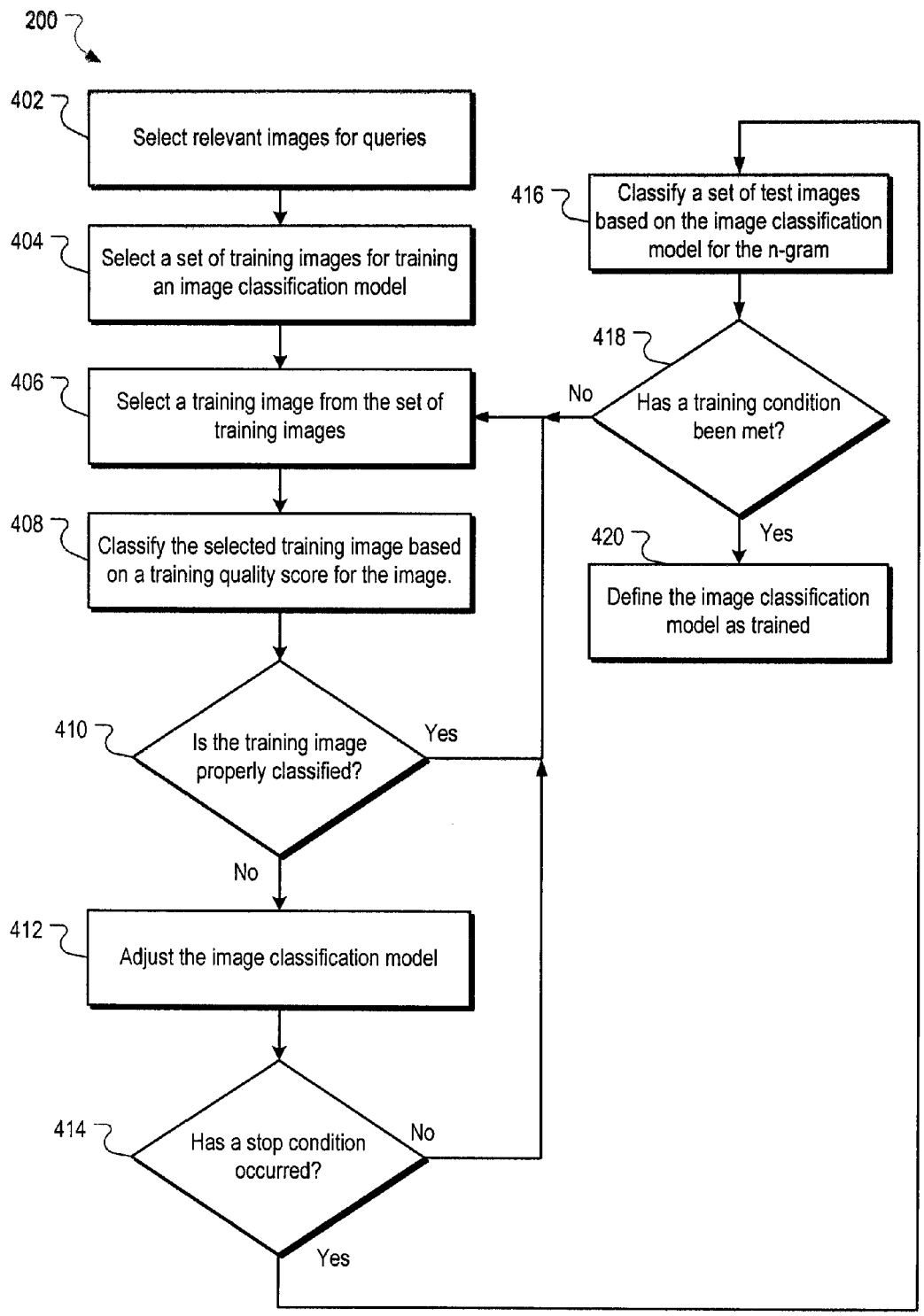
FIG. 4 is a flow chart of an example process for training an image classification model.

FIG. 4 is a flow chart of an example process 400 for training an image classification model. The process 400 is an iterative process by which an image classification model classifies training images and adjusts the image classification model based on feature vectors for incorrectly classified training images. Additional training images are classified by the adjusted image classification model and the image classification model is further adjusted until a stop condition occurs. Once the stop condition occurs, the image classification model is tested on a set of test images by classifying the images as positive images or negative images based on the quality scores of the images. When a classification error rate for the test images is less than a training threshold, the model is defined as trained and can be used to generate initial quality scores for images and classify the images as high quality images or low quality images. When the classification error rate meets or exceeds the training threshold, the iterative training process continues until the stop condition occurs again.

The process 400 can be implemented, for example, by the image quality subsystem 120. In some implementations, the image quality subsystem 120 includes one or more processors of a data processing device that are configured to perform the actions of the process 400. In other implementations, a computer readable medium can include instructions that when executed by a computer cause the computer to perform the actions of the process 400.

Relevant images for queries are selected (402). In some implementations, the relevant images for queries are images that have been previously selected to be referenced by search results for the queries. For example, images referenced by search results for the query "football" can be identified as relevant to the query football.

In some implementations, the relevant images for the queries can be selected from an index identifying images that were referenced by search results for queries that have been previously been submitted by users. For example, data specifying user queries and corresponding images that were referenced by search results for the user queries can be obtained from a data store, such as the historical data store 114 of FIG. 1.

A set of training images for training an image classification model are selected (404). In some implementations, the training images include positive images for the queries and negative images for the queries. As described above, the positive images have relevance scores for the queries that meet or exceed a threshold relevance score, while the negative images have relevance scores for the queries that do not meet or exceed the threshold relevance score.

In some implementations, the threshold relevance score for the training images are based on ordered search result presentation positions in which the training images were referenced. In these implementations, the positive images are images that are referenced by a top threshold number of ordered search result presentation positions for one or more queries, while negative images are images that are referenced in ordered search result presentation positions that are lower than the top threshold number of presentation positions for one or more queries. In these implementations, the thresholds are corresponding rank positions.

For example, positive images can be images that were referenced in search results positions 1-10 (i.e., a top 10 presentation positions on a search results page), while negative images can be images that were referenced in search results presentation positions 31-40. In this example, the threshold relevance score may include two values that respectively define thresholds for selecting positive images (i.e., images referenced in the top 10 presentation positions) and negative images (i.e., images referenced in presentation positions 31-40).

In other implementations, the relevance scores for the training images can be based on other forms of relevance for images relative to a query. For example, the relevance scores can be based on labels that are explicitly associated with images by users. Images that are explicitly associated with a label matching the query at least a threshold number of times can be identified as positive images for the query. Similarly, images that are explicitly associated with a label matching the query at least a threshold portion of the total number of times that the image has been associated with any label can be identified as a positive image for the query.

The set of training images can also be selected from a set of images that are identified as being presented on Web sites having known quality scores. For example, the positive images and the negative images can be selected from a Web site having a quality score that exceeds a specified Web site quality threshold.

Additionally, the training images can be selected based on user ratings of the images, for example, from photo sharing Web sites. For example, positive images can be selected from a set of images that appear on a photo sharing Web site and have at least a threshold user rating, as specified by users that rated the image. Similarly, negative images can be selected from a set of images appearing on the photo sharing Web site and having at less than a threshold user rating.

A training image is selected from the set of training images (406). In some implementations, the training image is semi-randomly selected from the set of training images. For example, each of the images can be associated with a unique numeric identifier and a semi-random number generator can be used to select one of the unique numeric identifiers. In turn, the training image associated with the selected unique numeric identifier can be selected from the set of training images.

In some implementations, the semi-random selection of training images can be subject to a selection requirement that specifies a likelihood that a negative and/or a positive image is selected from the set of training images. For example, the selection requirement can specify that a negative image be selected with a probability of 0.7, while a positive image is selected with a probability of 0.3. Thus, the semi-random number generator can select a negative image from the set of training images in 70% of all selections, while selecting a positive image the remaining 30% of the time.

The selected training image is classified based on a training quality score for the image (408). A training quality score ("training score") is computed for the selected training image based on the feature vector for training image. In some implementations, the training score for the selected training image is computed by the image classification model, for example, by computing a dot product of the feature vector for the image and a vector of weights that define the image classification model. The training score is a measure of quality for the image relative to the query. When the training score meets or exceeds a quality threshold, the image is classified as a high quality image. Otherwise, the image is classified as a low quality image.

The feature vector for an image is a vector having component values that are based on image feature values of the image. The image feature values represent visual features of one or more aspects of the image. Example image feature values for an image include values representing color, texture, edges and other characteristics of the image.

The image feature values can be extracted, for example, from the images during the crawling that is performed by the search system 110. Example processes for extracting values of image feature values include processes for generating color histograms, texture detection processes (e.g., based on spatial variation in pixel intensities), scale-invariant feature transform, edge detection, corner detection, discrete cosine transforms and geometric blur.

Example feature extraction processes are described below, but other feature extraction processes and techniques that provide a less dense set of feature values than those described below may also be used. In some implementations, some feature values are extracted for the image as a whole or larger sub-portions of the image than described below. For example, a color histogram for the image as a whole or one or more sub-portions of the image can be computed for the image. The sub-portions for which the color histogram is computed can be larger delineations of the image than those described below.

In some implementations, the image feature values for an image are detected at two or more image scales. For example, image feature values can be identified for a full resolution version of an image (e.g., 100% of native pixels) and for a higher and/or lower resolution version of the image by up-sampling and/or down-sampling the image. Identifying image feature values for images at various scales (i.e., resolution levels) can facilitate identification of relationships between images and text even when the images are provided with different resolution characteristics.

The image feature values are extracted, for example, from each of a plurality of overlapping square portions of each image. Edge histograms are based on differences in intensities of circular portions of the image that are centered at each pixel, referred to as a center pixel, of the square portions. For each circular portion, an intensity of the center pixel is compared to interpolated intensities of pixels that are located at eight equally spaced locations on an outer edge of the circular portion. Each of the pixels is determined to have a lower or greater intensity than the center pixel, and is assigned a respective 0 or 1 binary value based on the determination.

The eight binary values provide an eight-bit sequence that represents the texture of the circular portion. This eight-bit binary sequence can be represented as a 256-bin histogram. However, the bins corresponding to non-uniform sequences (i.e., sequences having more than two 1 to 0 or 0 to 1 transitions) can be merged, thereby allowing each of the 256 bin histograms to be mapped to 59 bin histograms.

Color histograms for each pixel are generated based on clustering techniques, such as k-means clustering. A color codebook is learned from red-green-blue pixels of sample images, for example, using machine learning processes. A color histogram for a square portion of the image is determined by mapping each pixel in the square portion to the color of the color codebook to which the pixel most closely corresponds.

In some implementations, the image feature values of images can be indexed based on a frequency with which the image feature values occur in various scaled versions of the image. Indexing the image feature values without a reference to the spatial relation of the image feature values in the image results in a "bag of image feature values" for the image.

The bag of image feature values for the image includes a frequency of image feature values that satisfy each feature category without considering where each of the image feature values occurs in image. Therefore, each image is characterized by frequency distribution of the image feature values for the image. Indexing image feature values of images as "a bag of image feature values" facilitates characterization of an image irrespective of the image scale.

In some implementations, the image feature values can be mapped to a discrete index of visual terms to represent the image feature values as a sparse vector. The visual terms represent sets of image feature values that may vary, but still represent similar visual features. For example, concatenated color and texture vectors having similar image feature values can be mapped to the same visual term even though variations may exist in the illumination or color of from which image feature values are identified. The mapping of concatenated feature vectors to visual terms can be learned, for example, according to relationship (1)

$$p_i = \frac{f_i * idf_i}{\sqrt{\sum_{j=1}^{|C|} (f_j * idf_j)^2}} \quad (1)$$

Where, $p_i$ is the weight of the visual term i in the an image p;

$f_i$ is the frequency of the visual term i in the image p;

$f_j$ is the frequency of the visual term j in the image p;

$idf_i$ is the inverse document frequency of visual term i, defined as $-\log(r_i)$, where $r_i$ is a fraction of training images containing at least one occurrence of visual term i;

$idf_j$ is the inverse document frequency of visual term j, defined as $-\log(r_j)$, where $r_i$ is a fraction of training images containing at least one occurrence of visual term j; and

|C| is the set of visual terms.

Relationship (1) provides visual term weights that normalize the sparse vector that results from mapping each the concatenated vectors for an image to visual terms. The normalization emphasizes concatenated vector values that correspond to rare visual terms (i.e., visual terms that appear in less than a threshold portion of all images) and de-emphasizes concatenated vector values that correspond to common visual terms (i.e., visual terms that appear in more than a threshold portion of all images). Thus, according to relationship (1), the less frequent a visual term appears in a corpus of images, the more informative the visual term is, and in turn, the higher the weight that the visual term receives.

The visual terms for each of the images can be indexed without reference to the spatial relation of the image feature values in the image. Indexing the visual terms without a reference to the spatial relation of the visual terms in the image results in a "bag of visual terms" for the image. In turn, the feature vector for the image can be a sparse vector of visual terms that represents a histogram of visual terms for the image.

The feature vectors for the training images are provided as an input to the image classification model to generate a training score by which the image can be classified. The image classification model computes the training score for the image based on a result of a function of the feature vector. In some implementations, the function by which the training score is computed is a dot product of the feature vector for the image and the vector of weights w for the image classification model.

Prior to classifying the first training image, the vector of weights $w_0$ for the image classification model can be initialized to default values. For example, each weight in the vector of weights can be set to "0." Subsequent computations of training scores for subsequently selected training images are computed based on the vector of weights $w_i$ that has been adjusted based on prior i training image classifications, as described below.

The training quality score for the training image is compared to the threshold quality score to determine whether the image is classified as a positive image or a negative image. As described above, when the training score meets or exceeds the threshold quality score, the image is classified as a positive image, and when the training quality score is below the threshold quality score, the image is classified as a negative image.

A determination is made whether the training image is correctly classified (410). In some implementations, the training quality score based classification is compared to the original classification of the training image. When the training quality score based classification matches the original classification the image is correctly classified by the image classification model, and another training image is selected (404).

When the quality score based classification does not match the original classification, the training image is incorrectly classified, and the image classification model is adjusted based on the feature vector of the training image (412). In some implementations, the vector of weights of the image classification model is computed based on a passive-aggressive model for images ("PAMIR"). One example of a PAMIR is described in "A Discriminative Kernel-based Model to Rank Images from Text Queries" David Grangier, Samy Bengio, IEEE Transactions on Pattern Analysis and Machine Intelligence, vol. 30 (2208), pp. 1371-1384, which is incorporated herein by reference in its entirety. Other passive aggressive learning processes can be used, as well as other machine learning systems, such as support vector machines.

PAMIR is a linear model that can be applied to infer non-linear decisions. PAMIR is implemented as a vector of weights, with each weight corresponding to a distinct image feature or visual term. The vector of weights is trained by iteratively computing training scores for the training images and adjusting the vector of weights based on the feature vectors of images that are incorrectly classified from the computed training scores. For example, the vector of weights can be adjusted so that a newly computed training score for the incorrectly classified training image is closer to a value at which the training image will be correctly classified than the previous training score.

In some implementations, the vector of weights is adjusted such that the each weight is proportional to a minimum difference between the support vector and the vector of weights for the previous iteration. The vector of weights are also adjusted such that each weight is proportional to a maximum of a specified aggressiveness constant (i.e., a constant that controls a tradeoff between minimizing expected error of future iterations and maintaining low vector weights) and a ratio of the distance between the training score and a Euclidean norm of a vector representing the difference between the support vector and the vector of weights for the previous iteration.

Once the image classification model has been adjusted, a determination is made whether a stop condition has occurred (414). The stop condition specifies when the iterative training of the model is to stop and testing of the model is to begin. The stop condition can occur, for example, when at least a minimum number of training iterations have occurred. Alternatively, the stop condition can occur when the image classification model has been adjusted less than a threshold amount over a previous N number of training iterations. When the stop condition has not occurred, another training image is selected (404).

When the stop condition has occurred, a set of test images are classified based on test quality scores ("test scores") for the test images (416). In some implementations, the set of test images include positive images and negative images that were not included in the set of training images. The test images included in the set of test images can be identified in a manner similar to that described above for identifying the training images. For example, positive images and negative images for queries can be used as test images.

In some implementations, the test scores are computed for the set of test images based on the feature vectors of the test images. For example, the test scores can be results of dot products of the feature vectors for the test images and the vector of weights for the image classification model.

The test scores for the test images are compared to the threshold quality score. The test images having test scores that meet or exceed the threshold quality score are classified as positive images, while test images having test score that are lower than the threshold quality score are classified as negative images.

Once the set of test images has been classified, a determination is made whether the image classification model meets a training condition (418). In some implementations, the training condition specifies a maximum error rate for a trained model. For example, the training condition can specify that a trained model has a classification error rate of less than 5%. Thus, when less than 5% of the test images are incorrectly classified based on the test score computed by the image classification model, the model is defined as trained. In contrast, when 5% or more of the test images are incorrectly classified based on the test score, the model continues to be trained.

In other implementations, the training condition specifies that an image classification model is trained when the classification error rate for the model converges to a value. For example, the training condition can specify that when the change in error rate for the image classification model changes less than a specified amount relative to the error rate for one or more previous iterations of testing, the image classification model is defined as trained. In these implementations, the change in error rate relative to the error rate for the one or more previous iterations is compared to the specified change in error rate. When the change in error rate for the image classification model exceeds the specified amount, the training condition has not been met. When the change in error rate is less than the specified amount, the training condition has been met.

When the image classification model does not meet the training condition, the image classification model requires additional training. In turn, another training image is selected from the set of training images (404) for training the image classification model, as described above.

When the image classification model meets the training condition, the image classification model is defined as trained (420) and the process 400 ends. The trained image classification model can be used to compute initial scores for images and the images can be classified as high quality images (i.e., positive images) or low quality images (i.e., negative images) based on the initial scores. Alternatively, the initial scores can be directly used to select images without first classifying the images.

In some implementations, the initial scores and/or values representing the classifications of the images can be provided as input to a relevance score function for computing relevance scores for images relative to a query, as described in more detail with reference to FIG. 5. In other implementations, the initial scores can be used in conjunction with a transformation factor for a query to generate query scores for the images. In turn, the query scores can be provided as input to a relevance score function to compute relevance scores for the images relative to the query.

In some implementations, a separate image classification model can be trained for different categories of images. For example, an image classification model can be trained for classifying or computing initial scores for images of people, while another image classification model can be trained for classifying or computing initial scores for images of landscapes. Training separate image classification models for different categories of images enables the model to be trained to identify characteristics of high quality images for the particular category of images, which may differ from characteristics of high quality images for other categories of image.

When an image classification model is trained for a particular category of images, the training images can be selected to only include images that belong to the particular category. For example, to train an image classification model for images of people, the training images can be selected, as described above, from search results for a query "people." In turn, the training images of people can be used to train the model, as described above.

An example training process is described above with reference to FIG. 4. Other training processes, methods, or algorithms can also be used. For example, a support vector machine that implements an adaptive boosting technique can be used to train the model. An example, adaptive boosting technique is described in "A Short Introduction to Boosting" Yoav Freund, Robert E. Schapire, Journal of Japanese Society for Artificial Intelligence, 14(5); 771-780, September 1999, which is incorporated herein by reference in its entirety.

Figure 5:
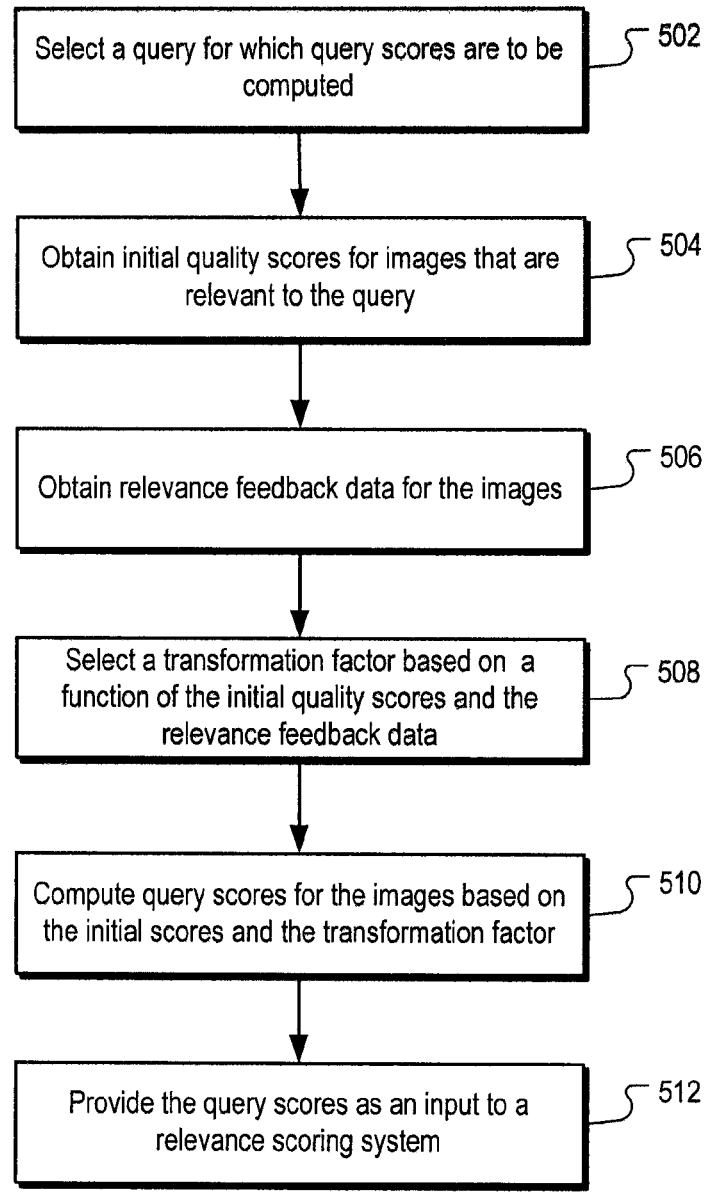
FIG. 5 is a flow chart of an example process for computing query scores for images relative to a query.

FIG. 5 is a flow chart of an example process 500 for computing query scores for images relative to a query. The process 500 is a process by which initial scores for images that are identified as relevant to a query and a transformation factor for the query are used to compute query scores for the images. As described above, the transformation factor is a value (or function) that is indicative of the importance of image quality for images referenced by search results for the query. In some implementations, a single transformation factor can be used to generate a score for each image irrespective of the queries for which the image is identified as relevant. In other implementations, query specific transformation factors can be used based on a relative importance of image quality to queries. For example, a higher transformation factor can be used for a query for which image quality is a more important factor for selecting search results, while a lower transformation factor can be used for another query for which image quality is a less important factor for selecting search results. The query scores that result from the process 500 can be used as a factor for computing or adjusting relevance scores for the images relative to the query.

The process 500 can be implemented, for example, by the image quality subsystem 120. In some implementations, the image quality subsystem 120 includes one or more processors that are configured to perform the actions of the process 500. In other implementations, a computer readable medium can include instructions that when executed by a computer cause the computer to perform the actions of the process 500.

A query for which query scores are to be computed is selected (502). In some implementations, the query can be selected, for example, from a data store that stores queries previously received from user devices, such as the historical data store 116.

Initial quality scores for images that are relevant to the query are obtained (504). In some implementations, the initial quality scores can be computed using feature vectors of the images as input to the image classification model, as described above. In other implementations, the initial quality scores can be obtained, selected or accessed from a data store that stores initial quality scores for images, such as the indexed cache 114.

Relevance feedback data for relevant images for the selected query are obtained (506). In some implementations, the relevance feedback includes selection data for images that are referenced by search results for the query. In these implementations, the relevance feedback data for a query can identify each image that has been referenced by search results for the query and a corresponding number of user selections or selection rate for the reference to the image. For example, the selection rate for a reference to an image can be computed as a ratio of number of selections of the reference relative to a total number of presentations of the reference in search results.

In other implementations, the relevance feedback data includes explicit user feedback data for the image relative to the query. For example, users can be provided graphical interfaces that enable the users to specify whether an image is a good image to be referenced by the search results for the query or a bad image to be referenced by search results for the query. Thus, this explicit user feedback is a user specified quality measure for the image relative to the query. This explicit user feedback can be aggregated for a statistically relevant number of users and used as relevance feedback for the query.

A transformation factor is selected for the query based on the relevance feedback data and the initial quality scores (508). In some implementations, the transformation factor is selected to reflect the relative importance of image quality for selecting images for search results for the query. For example, if relevance feedback data for the query indicates that images having initial scores that exceed a threshold ("high quality images") are selected more often for the present query than for other queries on average, a transformation factor can be selected to reflect this increased selection rate of high quality images.

For example, assume that high quality images are selected for presentation from search results twice as often for a particular query than other queries on average, the transformation factor for the query can be twice as large as a query independent or baseline transformation factor. Therefore, assuming that a baseline transformation factor for queries is 0.25, the transformation factor for the query can be 0.50.

Alternatively, the transformation factor can selected based on a function of the relevance feedback data and initial scores for resources corresponding to the relevance feedback data. For example, click weighted averages of the initial scores can be used to determine a transformation factor for the particular query. A query score is computed for the images based on the initial scores and the transformation factor (510). In some implementations, the query score is a function of the initial score and the transformation factor. For example, the query score for an image can be a result of a product of the initial score the transformation factor. Therefore, assuming that an image has an initial score of 1.4 and the transformation factor for the query is 0.50, the query score for the image will be 0.7 (i.e., 1.4 *0.5). The same image can have a different query score for another query, for example, when the other query has a transformation factor that differs from the transformation factor for the original query. For example, if the other query has a transformation factor of 1.5, the query score for the image will be 2.1, such that the quality of the image will be a larger component for computing a relevance score for the image.

In some implementations, an image may have multiple initial scores. For example, when separate image classification models are trained for different categories of images, an image that is identified as relevant to different search queries directed to different categories of images may include a separate initial score relative to each of the queries. When an image has multiple initial scores, the query score for the image can be computed for the image based on the initial score for a category of images to which the query is directed. For example, a query for a celebrity may be identified as being directed to a search for images of people. Thus, the initial score for the image that is computed using the image classification model for images of people can be used to compute the query score.

Query scores can be computed, as described above, for each image that is identified as relevant to a query. In some implementations, the query scores are provided as input to a relevance scoring system (512). The relevance scoring system can be, for example, a search system that computes relevance scores for images relative to search queries or the relevance scoring system can be a component of the image quality subsystem.

The query score can be used, for example, to adjust an original relevance score for images relative to a query. For example, an adjusted relevance score can be computed according to relationship (2)

$$\text{Adjusted\_Score} = \text{Original\_Score} * e^{(Query\_Score)} \qquad (2)$$

The adjusted score can be used, for example, to select images to be referenced in search results for a query, for example, in descending order of their adjusted scores.

The process 500 is described above with reference to using query specific transformation factors to compute quality scores. Query independent adjusted scores can be computed in a manner similar to that described above by using a query independent transformation factor for each image rather than a query specific transformation factor. In these implementations, the product of the initial score and transformation factor can be used, rather than the query score, for computing adjusted scores for the images as indicated in relationship (2).

The initial scores described above can also be used to compute an aggregate quality score for other network resources and specified delineations of a network. In some implementations, a Web page quality score can be computed for a Web page based on an aggregate of the initial scores for the images that are presented with the Web page. For example, the Web page quality score can be, for example, an average or another statistical measure or function of the initial scores for the images that are presented with the Web page. The Web page quality score can also be adjusted based on other characteristics of the Web page, such as relevance feedback data for the Web page, sizes of the images on the page, and other characteristics that are indicative of image quality.

In some implementations, aggregate quality scores are computed for sets of network resources or delineations of a network. For example, quality score can be computed for an entire Website or domain, specified subsets of Websites or domains that are defined by fewer network resources than the entire Website or domain, or any other specified delineation of a network or network resources. For example, a Website quality score can be computed for a Website based on a function of the images that are presented with Web pages of the Website. Similarly, a domain quality score can be computed for a domain based on a function of the initial scores for the images that are presented with Web pages of the domain.

In some implementations, a network can be delineated based on a set of network resources for a Website or domain that include only those network resources that are associated with a particular user account. For example, a quality score can be generated for each Web page of a user's account for a social networking site, weblog site, or image-sharing site based on a function of the initial scores for the images that are presented with each of the Web pages that correspond to the users account.

Figure 6:
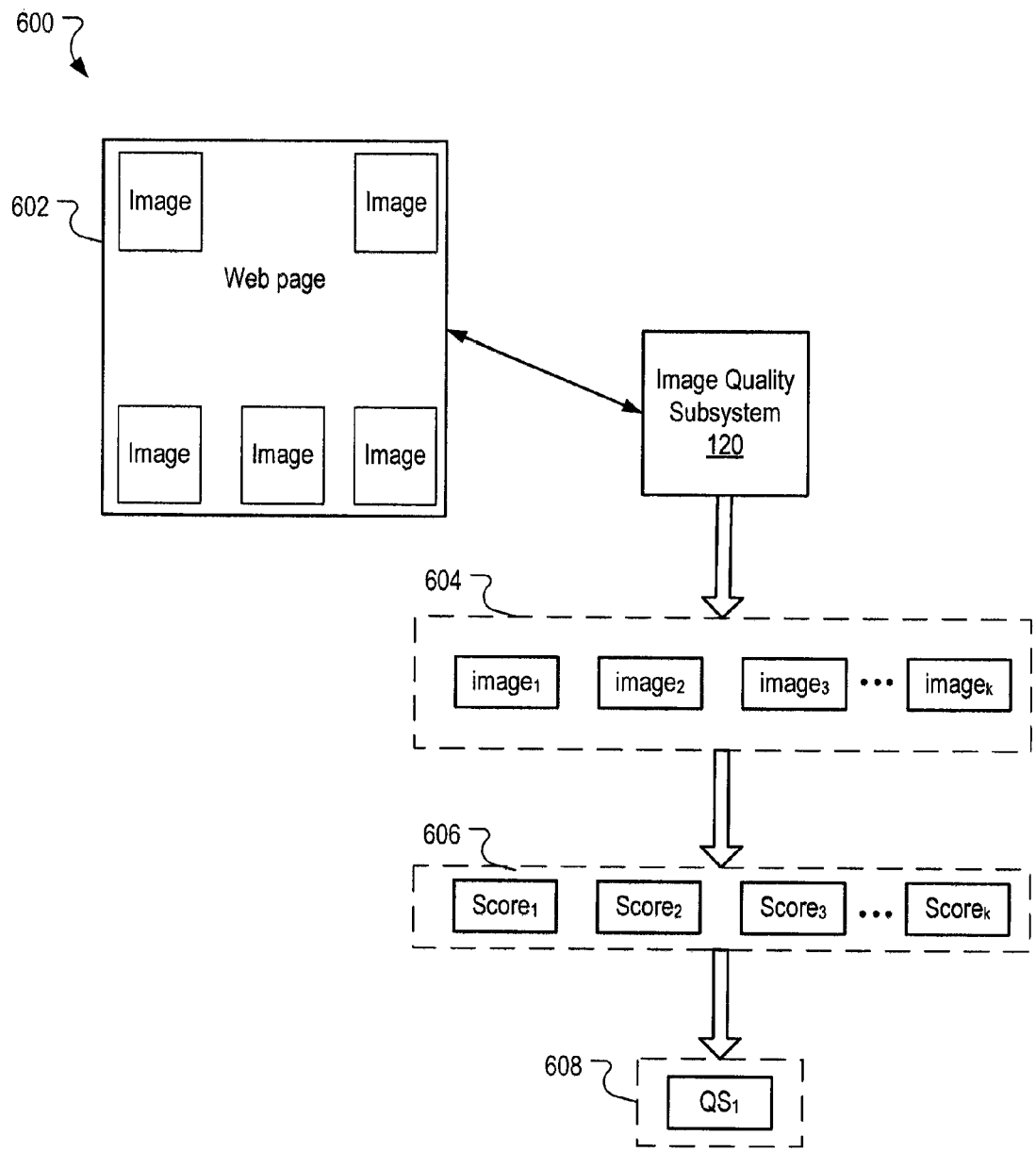
FIG. 6 is a block diagram of an example process flow for computing a quality score for a Web page.

FIG. 6 is a block diagram of an example process flow 600 for computing a quality score for a Web page 602. The image quality subsystem 120 selects a Web page 602 for which a Web page quality score is to be computed. The image quality subsystem 120 identifies the images (image$_1$-image$_k$) that are presented with the Web page 602 and define a set of images 604 with which the Web page image quality score is to be computed. The image quality subsystem 120 then obtains initial scores (Score$_1$-Score$_k$) that define a set of initial scores 606 for the set of images 604. In turn, the image quality subsystem 120 computes a Web page quality score 608 for the Web page 602 based on a function of the set of initial scores 606. For example, an average quality value of images that are presented with the Web page 602 can be computed as the Web page quality score 608. Additionally, the quality score 608 for the Web page quality score 608 can be based on a median quality value of images that are presented with the Web page 602, or only based on quality values for images that are included in a highest threshold percentage or threshold number of quality values for all images that are presented with the Web page 602.

The Web page quality score 608 can be used, for example, as a factor for generating a relevance score for Web pages that are identified as relevant to a query or otherwise identifying or selecting Web pages based on the quality of the images that are presented with the Web page.

In some implementations, the example process flow 600 can be used to compute quality scores for other delineations of a network, such as Websites, domains, and subsets of Websites or domains. In these implementations, the quality scores are computed based on a set of images that are presented with a Web page of the network delineation for which the quality score is being computed. For example, each image that is presented with a Web page in the network delineation can be included in the set of images 604. Alternatively, the quality score can be computed based on a function of the Web page quality scores for each Web page that is included in a Website, a domain or a subset of a Website, domain or other specified delineations of a network for which the quality score is being computed. For example, an aggregate quality score can be computed based on the quality scores of all images that are in a same specified delineation of a network.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    obtaining, by a data processing device, initial quality scores for relevant images for a query, the relevant images being images previously selected to be referenced by search results for the query;
    selecting, by a data processing device, a query-specific transformation factor for the query the transformation factor representing a measure of importance of image quality for computing relevance scores of relevant images for the query, the transformation factor being selected based, at least in part, on a comparison of a first number of previous user selections of high quality images for the query to a second number of previous user selections of high quality images for one or more other queries, a high quality image being an image having an initial quality score that meets a threshold score;

computing query specific quality scores for the relevant images based on a function of the transformation factor for the query and the initial quality scores for the images; and computing adjusted relevance scores for the relevant images based on the query specific quality scores and initial relevance scores for the relevant images.

2. The method of claim 1, wherein obtaining data representing initial quality scores comprises:

training an image classification model to compute initial quality scores based on feature vectors of images, the feature vectors comprising image feature values for the images; and computing the initial quality scores based on feature vectors for the relevant images.

3. The method of claim 2, wherein training the image classification model comprises:

selecting training images for training an image classification model, the training images comprising positive images and negative images;

identifying feature vectors for the training images, the feature vectors comprising feature values for the training images; and training the image classification model to generate an initial quality score based on the training images, the initial quality score being a query independent quality score.

4. The method of claim 3, wherein selecting training images comprises selecting positive images having relevance scores that meet or exceed a threshold relevance score for one or more queries and negative images having relevance scores that are less than the threshold relevance score for one or more queries.

5. The method of claim 3, wherein selecting training images comprises:

selecting positive images from a set of images that are referenced by a top threshold number of ordered search result presentation positions for one or more queries; and selecting negative images from a set of images that are referenced by a set of ordered search result presentation positions that are lower than the top threshold number of presentation positions for one or more queries.

6. The method of claim 3, wherein selecting training images comprises selecting, as the positive images and the negative images, images that are referenced by search results for a same query.

7. The method of claim 3, wherein selecting training images comprises selecting the positive images and the negative images from Web sites that are identified as high quality Web sites.

8. The method of claim 3, wherein selecting training images comprises selecting the positive images and the negative images based on user ratings of images.

9. A computer-implemented method, comprising:

obtaining, by a data processing device, initial quality scores for relevant images for a query, the relevant images being images previously selected to be referenced by search results for the query;

selecting, by a data processing device, a transformation factor for the query for which the relevant images are identified as relevant, the transformation factor representing a measure of importance of image quality for computing relevance scores of relevant images;

computing query specific quality scores for the relevant images based on a function of the transformation factor for the query and the initial quality scores for the images, wherein computing a query specific quality score comprises computing a product of the transformation factor and the initial quality score; and computing adjusted relevance scores for the relevant images based on the query specific quality scores and initial relevance scores for the relevant images.

10. A computer-implemented method comprising:

obtaining, by a data processing device, initial quality scores for relevant images for a query, the relevant images being images previously selected to be referenced by search results for the query, the initial quality scores being obtained based on an image classification model trained with:

positive images selected from a set of images that are referenced by a top threshold number of ordered search result presentation positions for one or more queries; and negative images selected from a set of images that are referenced by a set of ordered search result presentation positions that are lower than the top threshold number of presentation positions for one or more queries;

selecting, by a data processing device, a transformation factor for the query for which the relevant images are identified as relevant, the transformation factor representing a measure of importance of image quality for computing relevance scores of relevant images;

computing query specific quality scores for the relevant images based on a function of the transformation factor for the query and the initial quality scores for the images; and computing adjusted relevance scores for the relevant images based on the query specific quality scores and initial relevance scores for the relevant images.

11. A computer-implemented method, comprising:

obtaining, by a data processing device, initial quality scores for relevant images for a query, the relevant images being images previously selected to be referenced by search results for the query;

obtaining relevance feedback data for relevant images that have been selected in response to being referenced by search results for the query, wherein obtaining relevance feedback data for images comprises receiving data specifying a number of selections of the relevant images for presentation from the search results for the query;

selecting, by a data processing device, a transformation factor for the query for which the relevant images are identified as relevant, the transformation factor representing a measure of importance of image quality for computing relevance scores of relevant images, wherein the transformation factor is selected based on the relevance feedback data and initial quality scores for the relevant images;

computing query specific quality scores for the relevant images based on a function of the transformation factor for the query and the initial quality scores for the images; and computing adjusted relevance scores for the relevant images based on the query specific quality scores and initial relevance scores for the relevant images.

12. The method of claim 11, wherein obtaining relevance feedback data for relevant images further comprises receiving data specifying a user specified quality measure for the image relative to the query.

13. The method of claim 9, wherein training the image classification model comprises adjusting a vector of weights corresponding to image features based on image feature values of classified training images.

14. A non-transitory computer readable medium encoded with a computer program comprising instructions that when executed operate to cause a computer to perform operations:
obtaining data representing initial quality scores for relevant images for a query, the relevant images being images having at least a threshold relevance score for the query;
selecting a transformation factor for the query for which the relevant images have been identified as relevant, the transformation factor representing a measure of importance of image quality relative to relevance feedback data for computing a relevance scores of relevant images for the query, the transformation factor being selected based, at least in part, on a comparison of a first number of previous user selections of high quality images for the query to a second number of previous user selections of high quality images for one or more other queries, a high quality image being an image having an initial quality score that meets a threshold score;
computing query specific quality scores for the relevant images based on a function of the transformation factor for the query and the initial quality scores for the images; and
computing adjusted relevance scores for the relevant images based on the query specific quality scores and an initial relevance score for the relevant images.

15. A system, comprising:
a data store storing queries that were previously received from users and data identifying images that were referenced in search results responsive to the queries; and
an image quality subsystem coupled to the data store, the image quality subsystem including at least one processor operable to compute, for a query, query specific quality scores for images based on initial quality scores for the images and a transformation factor for the query, the transformation factor for the query representing a measure of importance of image quality for computing relevance scores for the images for the query, the transformation factor being selected based, at least in part, on a comparison of a first number of previous user selections of high quality images for the query to a second number of previous user selections of high quality images for one or more other queries, a high quality image being an image having an initial quality score that meets a threshold score.

16. The system of claim 15, wherein the image quality subsystem is further operable to compute adjusted relevance score for the images based on the query specific quality scores and initial relevance scores for the images.

17. The system of claim 15, wherein the image quality subsystem is further operable to compute initial quality scores for the images based on an image classification model that is trained based on feature vectors of positive images and negative images, the positive images being images having relevance scores for one or more queries that exceed a threshold relevance score, the negative images being images having relevance scores for one or more queries that do not exceed the threshold relevance score.

18. The system of claim 15, wherein the image quality subsystem is further operable to select a transformation factor for a query based on quality measures of images that were previously selected for presentation from search results for the query.

19. A system comprising, a data store storing queries that were previously received from users and data identifying images that were referenced in search results responsive to the queries; and
an image quality subsystem coupled to the data store, the image quality subsystem including at least one processor operable to compute query specific quality scores for images based on initial quality scores for the images and a transformation factor for the query, the transformation factor for the query representing a measure of importance of image quality for computing relevance scores for the images, wherein the image quality subsystem is further operable to obtain relevance feedback data for images that were reference by search results for the query and select a transformation factor based on the relevance feedback data, and wherein the relevance feedback data specifies a number of selections of the images from the search results for the query.

20. The system of claim 19, wherein the relevance feedback data further includes a user specified quality measure for the image relative to the query.

21. A method, comprising:
selecting, by a data processing device, a Web page for which a quality score is to be computed;
computing, by a data processing device, initial quality scores for images that are presented with the Web page based on feature vectors for the images and an image classification model that is trained to provide image quality scores based on feature vectors;
computing, by a data processing device, a Web page quality score based on a function of the initial quality scores; and
computing, by a data processing device, an adjusted relevance score for the Web page based on the Web page quality score, wherein computing a Web page quality score comprises computing an average quality value for images that are presented with the Web page.

22. The method of claim 21, further comprising:
computing additional Web page quality scores based on images that are presented with additional Web pages that are included in a same specified delineation of a network; and
computing a quality score for the specified delineation of the network based on the additional Web page quality scores.

23. The method of claim 22, wherein each of the additional Web pages are included in a same user account.

24. The method of claim 21, wherein computing a Web page quality score comprises computing the Web page quality score based on a function of the initial quality scores and characteristics of the Web page.

25. The method of claim 24, wherein the characteristics include sizes of the images.

26. The method of claim 21, further comprising:
computing additional initial quality scores for additional images that are presented with additional Web pages that are included in a same specified delineation of a network; and
computing a quality score for the specified delineation of the network based on the additional initial quality scores.

* * * * *

UNITED STATES PATENT AND TRADEMARK OFFICE
CERTIFICATE OF CORRECTION

| | | |
|---|---|---|
| PATENT NO. | : 8,370,282 B1 | Page 1 of 1 |
| APPLICATION NO. | : 12/507276 | |
| DATED | : February 5, 2013 | |
| INVENTOR(S) | : King Hong Thomas Leung and Charles J. Rosenberg | |

It is certified that error appears in the above-identified patent and that said Letters Patent is hereby corrected as shown below:

Title Page, Item (56) Other Publications, Column 2, Line 8 – delete "Kernal-based" and insert -- Kernel-based --, therefor.

Signed and Sealed this
Twenty-first Day of May, 2013

Teresa Stanek Rea
*Acting Director of the United States Patent and Trademark Office*